Patented Sept. 24, 1929

1,729,162

UNITED STATES PATENT OFFICE

CHARLES E. COATES, OF BATON ROUGE, LOUISIANA, ASSIGNOR TO OSCAR L. BARNEBEY, OF COLUMBUS, OHIO

MANUFACTURE OF VEGETABLE CHAR

No Drawing. Application filed April 22, 1921. Serial No. 463,570.

The present invention relates to the production of a material for use as a decolorizer and filtering material, for use in decolorizing and filtering various liquids from which it is desired to remove the color to some extent, examples of such liquids being cane sugar juice and cane sugar syrups and liquids containing sugar which are made or treated in the manufacture and refining of sugar, also liquids in various other industries such as the manufacture of glycerine from fats, manufacture of maltose and glucose by the hydrolysis of starch, manufacture of lactose from milk and whey and the like. In all of these cases certain substances are present in the liquids which it is desired to remove, these substances being either present in the raw material or developed during the process of manufacture, and the substances which it is desired to remove are particularly those which produce a disagreeable color or flavor in the liquid or product. These substances are ordinarily present in relatively small quantities but nevertheless must be removed in order to make the product merchantable or to enhance its commercial value. Various substances have heretofore been employed in refining operations of this character, and many of these depend upon the adsorbing action of carbon.

The carbon may be obtained from animal sources, as in the case of bone-black, or from vegetable sources. It may also be made by impregnating some inert or nearly inert substance with an extract of animal or vegetable origin, and carbonizing. When obtained from vegetable sources, it has been prepared in some cases by carbonizing the vegetable material after impregnation with lime or some other mineral substance which must subsequently be extracted with acid or water. It may also be prepared from a highly silicious vegetable material, like rice hulls, by carbonizing, extracting the excess silicic acid by digestion with strong sodium hydroxide, washing, and subsequently treating with acid. To do away with the expensive equipment necessary in using bone-black successfully, it has been proposed to substitute for bone-black, a char of vegetable origin and high decolorizing power. The foregoing facts are well known.

The purpose of my invention is to prepare a vegetable char without impregnation with lime or other mineral substances, and without extracting silica by means of strong alkalies, which char will act both as a decolorant and as a filter aid. I propose at the same time to make use of by-products, when these are available, such as at the present time have little or no value.

Such by-products of the sugar industry are primarily three, viz., the "trash", which consists of the leaves of sugar cane, which at present are not generally commercially employed; cane tops, of which little use is made except when they are used for planting sugar cane; and bagasse, which material is ordinarily used as fuel, having a commercial value as such equal to about one-fourth of its weight in coal. The can refuse of the character referred to is capable of use for producing a good quality of char having excellent physical properties, and of these materials, the trash or leaves is particularly advantageous as containing a sufficient amount of silicious material to form a rugged structure without artificial impregnation thereof. This material may be used alone or it may be mixed with any desired proportion of the other refuse materials above referred to. Other materials as mentioned below are also highly suitable in the process. Such other materials are the leaves, husk and stalks of corn, or the straw and chaff of wheat, rice and other cereals. Hereinafter the term "trash" will be employed as embracing the materials of the character specified.

The operation of producing my improved char may be conducted by first subjecting the trash, in the substantial absence of air, to a temperature of about 500° to 550° C., then cooling under exclusion of air, then preferably washing, first with water, and then with an acid such as dilute hydrochloric, drying, and then crushing to about 60 to 80 mesh, then heating to about 800° C. to 850° C., and allowing during such heating operation the presence of a small amount of air, sufficient to burn out most of the hydrogen contained therein but insufficient to burn out any large percentage of the carbon, preferably then further heating to a temperature of about 900° to 950° C., (while allowing some access of air) and finally cooling to atmospheric temperature under the exclusion of air, digesting with hydrochloric acid of 15 to 20% strength, washing and drying.

To describe a typical operation more specifically, sugar cane trash, consisting essentially of the leaves stripped from sugar cane, is placed in a retort or muffle of a furnace, and is heated rapidly up to about 500° to 550° C. while withdrawing the volatile products of the primary decomposition to a condenser in which the liquids are condensed and from which the gases may pass to a gas-holder for use as fuel gases. During this operation the gases may be drawn from the retort by means of a suitable exhaust fan or blower if desired, approximately atmospheric pressure being maintained in the distillation retort, although if desired a slight vacuum might be produced. The solid product of this operation is then cooled to about atmospheric temperature, while being kept out of contact with air. The resulting material may if desired be extracted with water to remove water-soluble ash, including potash salts, and the like. The solid material may also if desired be washed with a dilute acid such as 5% hydrochloric, in order to remove lime and material soluble in such acid solution. It is possible to get good results without these leaching operations but ordinarily I consider it advisable to leach in the manner indicated.

The char produced in this operation contains a considerable percentage of hydrogen probably in some form existing in combination with carbon. This product has good filtering properties and is capable of use as an aid in filtration, to prevent the liquid from flowing through the filter-press in a cloudy condition due to the presence of very finely-divided suspended particles. However, the material does not have very good decolorizing properties and it is preferable to heat the material further in order to develop the decolorizing and deodorizing capacity. Whether the material is to be used in this form or it is to be further heated it is at this stage comminuted, preferably to about 60 to 80 mesh-size. The crushed material is then heated to bright redness, or, say, to about 800° C. to 850° C., and either during or after this treatment the material is treated with a small amount of air. This operation can be effected in a horizontal externally heated pipe, with loosely fitting covers at the ends thereof. It is desired in this operation not to burn out any more of the carbon than is necessary, and it is also advisable to burn out or rid the product of a large fraction of its content of residual organic matter. For this purpose the amount of air admitted during this step is very carefully watched and in many instances it might be advisable to test this operation frequently to ascertain that the correct amount of air is introduced to burn out most of the hydrogen without burning any substantial amount of the carbon. It is preferable to so control the admission of air that most of the hydrogen and only very little of the carbon is consumed. It is frequently advisable during this operation to tumble the material, and for this purpose the operation may conveniently be carried out in a rotary kiln, or in a muffle or oven provided with a drag or stirrer.

The material is then transferred to a closed receptacle and allowed to cool in the absence of air, digested with HCL of 15 to 20% strength, washed and dried. At this stage the material will be found to be highly active, both as a decolorizing material and as a deodorizing material and also has physical properties which make it highly useful as a filter aid.

The material can, however, be further activated by raising its temperature to a reddish white or white heat, say, about 900° to 950° C., before the cooling digesting and drying operations referred to. This heat does not have to be maintained for a long period, about 10–15 minutes being found to give excellent results. This can be performed in a horizontal pipe with air admitted under control as above described. This product is then ready for use as a substitute for bone-black. It carries sufficient insoluble ash, mainly silica, to possess a rugged structure so that it will not crumble too easily, but will maintain its granular condition during use and on revivifying. Its filtering power is high and its decolorizing power is many times higher than that of bone-black. This material is used in decolorization processes by digesting with the liquid in question and filtering off the char through some type of filter press.

After the char has become fouled in use, so that it will not take up the coloring matters of the solutions or liquors readily, it can be revivified, for example by boiling first with a 4% hydrochloric acid solution and subsequently with a 4% caustic soda solution and washing. It can then be reused in decolorizing and filtering operations.

The char can be revivified by being heated after a preliminary treatment by acid or alkali, or it may be revivified by heat without any chemical treatment. For this purpose it may be placed in a rotary kiln externally heated and having a regulated air inlet. The material should preferably be heated to about 500°–550° C. without access of any substantial amount of air, and then a small and regulated amount of air can be introduced to burn off the products resulting from the charring of the organic matter taken up in the char from the liquor.

It is advisable before using the material as a decolorizing and deodorizing agent and a filter aid, and also before re-using the revivified material for this pure, to sift out any dust-like particles which may be present. The agitation during heating operations always tends to produce more or less crushing, and the sifting is to remove the fine material produced thereby, since such fine material would have a tendency to clog the filters and hence slow down the filtration operation.

In the above example I have particularly described the treatment of sugar cane leaves. However, I desire to call attention to the fact that other analogous materials as above specified may be substituted for all or a part of the sugar cane leaves, or other substances may be intentionally added to these leaves or equivalent material. I further call attention to the fact that the temperatures mentioned are given for the purpose of illustration and not as positively restricting the invention to the use of these specific temperatures.

Inasmuch as the adsorbing power of chars probably depends upon the surface of free carbon exposed as well as upon the size of the pores, the purpose of the foregoing process is to remove by selective oxidation from such free carbon surface and pores any residual film which might prevent such surfaces or pores from coming in contact with the liquid to be decolorized. The final high temperature treatment is for the purpose of changing the size of the pores so that the char will have maximum decolorizing power. Inasmuch as in ordinary chars the free surface of carbon and also the pores may be covered not only by a film of residual complex organic matter, but also by a fused insoluble ash, which is for the most part silicious, these activated chars may also be further activated by treatment with hydrofluoric acid, thus removing the silica in the form of the volatile silicon tetrafluoride, from which the hydrofluoric acid may be recovered by well known chemical processes) and returned to process, or the vapors of the fluoride may be passed into sodium hydroxide solution and recovered as sodium silico-fluoride. The hydrofluoric acid treatment is applied preferably to the finished char.

A dilute solution (say ½ to 1% strength, more or less) of commercial HF may be added directly to the char in a lead tank and removed by evaporation, or preferably the gaseous HF may be admitted to and passed through a lead-lined cylinder provided with a lead stirrer for agitating the char, which process may be made continuous. It is not proposed to remove all the silica but only that in the film protecting the carbon surface. Hence the minimum quantity of acid is used, leaving enough silica in the char to make the grain rugged. Chars obtained by this treatment are found more active than those obtained in any other way.

I claim:

1. The process of making vegetable char comprising carbonizing vegetable material by destructive distillation; and heating the char in the presence of air at temperatures substantially upwards of 550° C., meanwhile controlling the amount of air to burn out of the char most of the hydrogen and a limited amount of carbon.

2. The process of making vegetable char comprising carbonizing vegetable material by destructive distillation; and heating the char in the presence of air at temperatures upwards of 800° C., meanwhile controlling the amount of air to burn out of the char most of the hydrogen and a limited amount of carbon.

3. The process of making vegetable char comprising carbonizing vegetable material by destructive distillation; leaching the char to remove ash therefrom; and thereafter heating the char in the presence of air at temperatures substantially upwards of 550° C., meanwhile controlling the amount of air to burn out of the char most of the hydrogen and a limited amount of carbon.

4. The process of making vegetable char comprising carbonizing vegetable material by destructive distillation; leaching the char to remove ash therefrom; and thereafter heating the char in the presence of air at temperatures upwards of 800° C., meanwhile controlling the amount of air to burn out of the char most of the hydrogen and a limited amount of carbon.

5. The process of making vegetable char comprising carbonizing vegetable material by destructive distillation; treating the char with mineral acid solution to remove ash; washing and drying the char; and heating the char in the presence of air at temperatures upwards of 800° C., meanwhile controlling the amount of air to burn out of the char most of the hydrogen and a limited amount of carbon.

6. The process of making vegetable char comprising carbonizing vegetable material by destructive distillation; and heating the char in the presence of air at temperatures upwards of 900° C., meanwhile controlling the amount of air to burn out of the char most of the hydrogen and a limited amount of carbon.

7. The process of making vegetable char comprising carbonizing vegetable material by destructive distillation; and heating the resulting char in the presence of air at temperatures from 800° to 950° C., meanwhile controlling the amount of air to burn out of the char most of the hydrogen and a limited amount of carbon.

8. The process of making vegetable char comprising carbonizing vegetable material by destructive distillation; heating the resultant char in the presence of air at temperatures substantially upwards of 550° C., meanwhile controlling the amount of air to burn out of the char most of the hydrogen and a limited amount of carbon, cooling the char while excluding air therefrom; treating the char with mineral acid solution; and drying the char.

9. The process of making vegetable char comprising carbonizing vegetable material by destructive distillation; heating the char in the presence of air at temperatures substantially upwards of 550° C., meanwhile agitating the char and controlling the amount of air to burn out of the char most of the hydrogen and a limited amount of carbon.

10. The process of making vegetable char comprising carbonizing vegetable material by destructive distillation, meanwhile removing the vapors formed; and heating the char in the presence of air at temperatures substantially upwards of 550° C., meanwhile controlling the amount of air to burn out of the char most of the hydrogen and a limited amount of carbon.

11. In the manufacture of vegetable char, the improvement which comprises agitating the said material in a flowing atmosphere containing hydrofluoric acid gas.

12. The process of manufacturing vegetable char comprising charring vegetable material containing silica at temperatures upwards of 500° C., and treating the resultant char with hydrofluoric acid to remove a substantial part of the silica.

13. The process of manufacturing vegetable char comprising charring vegetable material containing silica at temperatures upwards of 500° C., thereby producing a char having silica in the surface of its particles and having silica within said particles; and treating the said char with hydrofluoric acid, whereby the silica in the surface of the particles is, at least in large part removed.

14. The process of making vegetable char comprising carbonizing vegetable material by destructive distillation; heating the char in the presence of air at temperatures substantially upwards of 550° C., meanwhile controlling the amount of air to burn out of the char most of the hydrogen and a limited amount of carbon; and treating the resulting product to remove ash.

15. The process of making vegetable char comprising carbonizing vegetable material by destructive distillation; heating the char in the presence of air at temperatures substantially upwards of 550° C., meanwhile controlling the amount of air to burn out of the char most of the hydrogen and a limited amount of carbon; and treating the resulting product with acid to remove ash.

In testimony whereof I affix my signature.

CHARLES E. COATES.